United States Patent [19]
Heidenreich et al.

[11] Patent Number: 5,688,176
[45] Date of Patent: Nov. 18, 1997

[54] MULTIPLE DISK TORQUE LIMITER FOR HOLLOW SHAFT MOTORS

[75] Inventors: David C. Heidenreich, Akron; Keith A. Nichols, North Canton, both of Ohio

[73] Assignee: Power Transmission Technology, Inc., Sharon Center, Ohio

[21] Appl. No.: 489,695

[22] Filed: Jun. 12, 1995

[51] Int. Cl.$^6$ .................................................. F16D 7/02
[52] U.S. Cl. ........................................ 464/48; 116/208
[58] Field of Search ............................ 464/45, 47, 48, 464/41, 23; 192/56.6, 30 W; 116/208, 20 S, DIG. 17, 283

[56] References Cited

U.S. PATENT DOCUMENTS

| | | | |
|---|---|---|---|
| 3,813,178 | 5/1974 | Herbenar et al. | 116/208 X |
| 3,850,443 | 11/1974 | Hassan | 116/208 X |
| 4,373,358 | 2/1983 | Pearch et al. | 464/48 |
| 4,445,876 | 5/1984 | Entrup | 464/48 |
| 4,508,196 | 4/1985 | Jamon | 116/208 X |
| 4,617,003 | 10/1986 | Bober et al. | 464/48 |
| 4,661,083 | 4/1987 | Heidenreich et al. | 464/48 |
| 5,129,497 | 7/1992 | Kelly | 464/48 X |
| 5,295,909 | 3/1994 | Heidenreich | 464/48 |

FOREIGN PATENT DOCUMENTS

| | | | |
|---|---|---|---|
| 857594 | 8/1981 | U.S.S.R. | 464/48 |

*Primary Examiner*—Daniel P. Stodola
*Assistant Examiner*—Eileen A. Dunn
*Attorney, Agent, or Firm*—Renner, Kenner, Greive, Bobak, Taylor & Weber

[57] ABSTRACT

A torque limiting clutch for use with a hollow shafted motor has an input hub in operative connection with the hollow input shaft. A back plate is disposed at a fixed distance from the input hub. A plurality of interleaved friction disks and separator plates are interposed between the input hub and the back plate. A pressure plate is interposed between the input hub and the interleaved friction disks and separator plates. Spring cup assemblies are operatively interposed between the input hub and the pressure plate, urging the pressure plate toward the back plate and urging the friction disks and separator plates into frictional engagement. An output hub is connected to the friction disks and supported by a bearing from the back plate. An output shaft is connected to the output hub and extends through at least part of the hollow input shaft.

27 Claims, 2 Drawing Sheets

5,688,176

MULTIPLE DISK TORQUE LIMITER FOR HOLLOW SHAFT MOTORS

TECHNICAL FIELD

The invention herein resides in the art of power transmission devices and, more particularly, to torque limiting clutches of the friction type. More specifically, the present invention presents a torque limiting clutch designed for use with hollow shaft motor applications.

BACKGROUND OF THE INVENTION

The use of torque limiting clutches between input power sources and output mechanisms is well known. Typically, a torque limiting clutch has a characteristic breakaway torque allowing slippage between input and output shafts or mechanisms when the torque on the shafts exceeds the characteristic breakaway torque of the clutch.

Some machinery that implements torque limiting clutches use hollow shaft motors. For example, various pieces of underground mining equipment use hollow shaft electric motors to drive work implements. These motors commonly have a torque limiting clutch attached to one end, with the clutch input secured to the hollow motor shaft. The output of the torque limiting clutch is connected to an output shaft, or torque shaft, that delivers torque to a work implement or a gear reduction box. Typically, the output shaft travels back through the motor inside the hollow motor shaft. The purpose for such an arrangement is to provide for easy accessibility to the clutch for servicing and to position the clutch on the opposite side of the motor than the work implement. When in use, the work implement may encounter a jam that creates a high level of torque. The purpose of the torque limiting clutch is to prevent this high level of torque from damaging the drive system components.

Access to a torque limiting clutch is necessary because the clutch must be disassembled to replace worn friction elements in the clutch and other maintenance activities. Access is also required because the clutch must be disassembled so that the input can be secured to the motor shaft. It is thus desirable to have a torque limiting clutch that is easy to disassemble and reassemble and is generally positioned in an accessible location.

It is also desirable that an operator be able to determine the breakaway torque of the torque limiting clutch by quickly examining the clutch. Easily verifying the breakaway torque is necessary for insuring a proper torque limiting setting for the clutch for a given machine or work implement.

It is also desirable that an operator be able to determine when the torque limiting clutch needs repaired or maintained by looking at an indicator. Repair or maintenance is necessary because after certain periods of use the friction elements in the torque limiting clutch wear out. Excessively worn friction elements lower breakaway torque creating unfavorable conditions.

Additionally, in some applications, particularly mining applications, it is desirable that a torque limiting clutch be able to provide significant breakaway torque and energy capacity within a small diameter.

DISCLOSURE OF INVENTION

In light of the foregoing, it is a first aspect of the present invention to provide a torque limiting clutch that is characterized by ease of assembly and disassembly.

Another aspect of the present invention is the provision of a torque limiting clutch that provides a high characteristic breakaway torque within a small diameter.

Another aspect of the present invention is the provision of a torque limiting clutch, as above, for use with hollow shaft motor applications.

Yet another aspect of the present invention is the provision of a torque limiting clutch having at least one wear indicator that may be used by an operator to determine when the friction elements in the clutch require maintenance.

Still another aspect of the present invention is to provide a torque limiting clutch, as above, that provides an operator access to view the color of the springs that create the characteristic breakaway torque of the clutch.

A further aspect of the present invention is to provide a torque limiting clutch wherein the spring elements exert force in line with the friction elements.

The foregoing and other aspects of the invention which will become apparent as the detailed description proceeds are achieved by a torque limiting clutch, comprising: an input hub; a back plate maintained in a fixed spaced relationship with the input hub; a plurality of friction disks interleaved with at least one separator plate between the input hub and the back plate; a pressure plate interposed between the input hub and the interleaved friction disks and at least one separator plate; spring means operatively interposed between the input hub and the pressure plate for urging the friction disks and at least one separator plate into frictional engagement with each other; an output hub operatively connected to the friction disks; and, a bearing interposed between the output hub and the back plate.

Additional aspects of the present invention are achieved by a torque limiting clutch, comprising: an input hub; a back plate fixedly interconnected to the input hub; friction disks interleaved with at least one separator plate and a pressure plate maintained between the input hub and the back plate; spring means engaging said pressure plate and urging the frictions disks, the separator plate, and the pressure plate into frictional engagement; the input hub, back plate, pressure plate, spring means, and separator plate comprising a first unit; an output hub; at least one of the friction disks connected to the output hub; the friction disks and the output hub comprising a second unit; and, the first and second units being selectively interconnected with and disconnected from each other.

BRIEF DESCRIPTION OF THE DRAWINGS

For a complete understanding of the objects, techniques, and structure of the present invention reference should be made to the following detailed description and the accompanying drawings wherein.

BEST MODE FOR CARRYING OUT THE INVENTION

Figure 1:
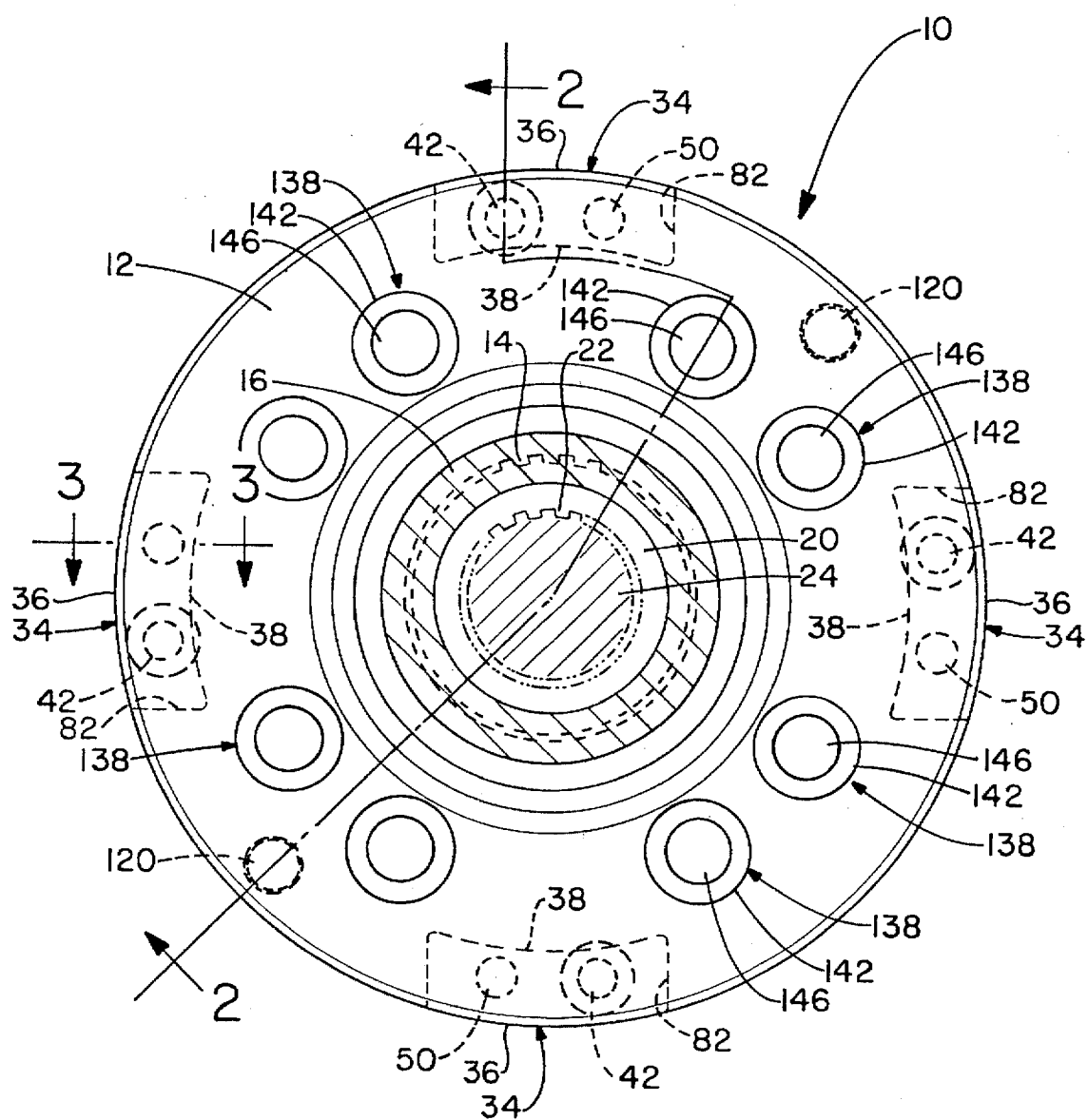
FIG. 1 is an end view of the torque limiting clutch according to the present invention.

Referring now to the drawings, it can be seen that a torque limiting clutch assembly according to the present invention is designated generally by the numeral 10. An input hub 12 is provided with a spline 14 therein for securing the input hub 12 in operative power transmission engagement with a hollow input shaft 16. The input shaft 16 is adapted for operative power transmission connection with a motor 18 and may be integrally connected with the motor 18. The input shaft 16 is further restrained by a locknut 28 that threadedly engages the input shaft 16 and abuts a portion of the input hub 12. Of course, other suitable engagement means may be so employed. As may also be seen in FIG. 2, an output hub 20 is similarly provided with a spline 22 therein for securing the output hub 20 in operative power transmission engagement with an output shaft 24. The output shaft 24 extends through the hollow input shaft 16 and through the motor 18.

Power is transferred from the input hub 12 to the output hub 20, and conversely from the output hub 20 to the input hub 12, through a plurality of separator plates and friction disks 26. The plurality of separator plates and friction disks 26 are disposed within a cavity 30 that is established by the input hub 12, the output hub 20, and a back plate 32. The cavity 30 is closed by a seal 33 disposed between the input hub 12 and the output hub 20.

A plurality of legs 34 extend rearwardly from the input hub 12. In the preferred embodiment of the present invention, four legs 34 extend from the input hub 12. The legs 34 are spaced at 90° intervals about the input hub 12 as can be best seen in FIG. 1. The outer 36 and inner 38 surfaces of the legs 34 are curved along a circle concentric to the portion of the input hub 12 that contacts the hollow input shaft 16.

Figure 2:
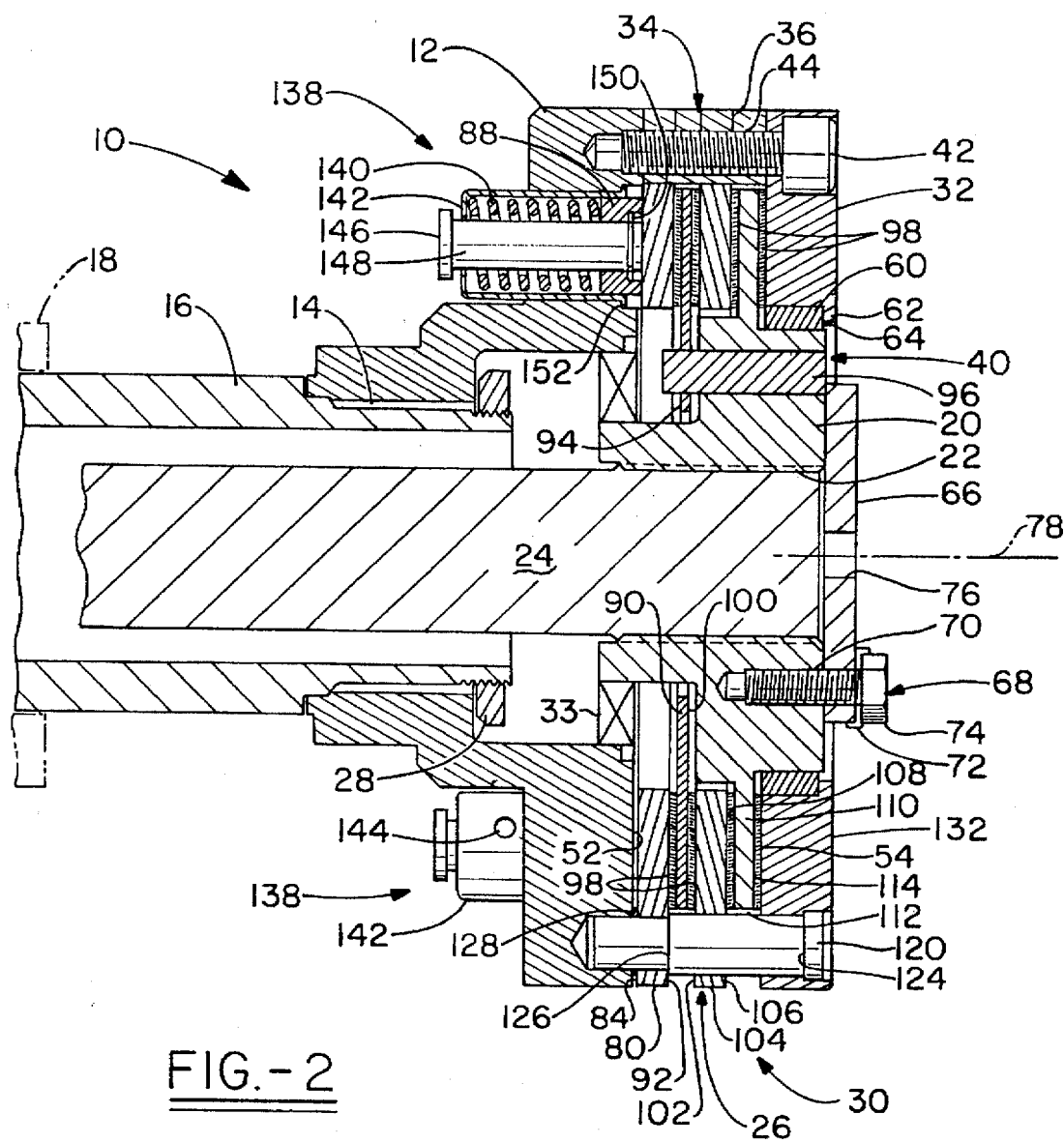
FIG. 2 is a cross-sectional view of a torque limiting clutch according to the present invention taken along line 2—2 in FIG. 1; and, FIG. 3 is a cross-sectional view of a portion of a torque limiting clutch according to the present invention taken along line 3—3 of FIG. 1.
Figure 3:
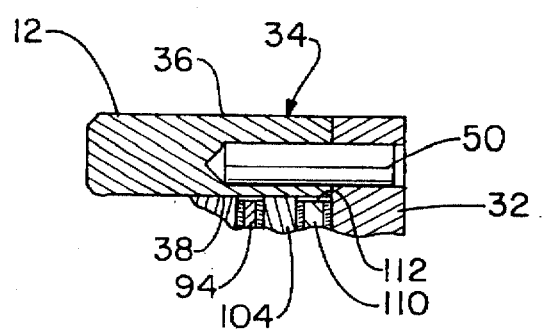

The back plate 32, as seen in FIG. 2, abuts the legs 34. The back plate 32 is disk-shaped and has a circular-shaped, centrally-disposed opening 40. The back plate 32 is attached to the input hub 12 by a plurality of bolts 42. Each bolt 42 threadedly engages a corresponding threaded bore 44 disposed in the leg 34. Each bolt 42 may be countersunk into the back plate 32 as shown in FIG. 2. As can be seen in FIG. 1, an alignment dowel 50 is disposed next to each bolt 42. As seen in FIG. 3, each alignment dowel 50 extends through the back plate 32 into the leg 34 projecting from the input hub 12. The alignment dowels 50 assist in assembling the torque limiting clutch assembly 10 by aligning the back plate 32 with the input hub 12 before the bolts 42 are inserted. The alignment dowels 50 also assist in transferring torque between the input hub 12 and the back plate 32. The combination of the back plate 32 and the input hub 12 creates a fixed-depth cavity 30, the depth of which is the distance between the back surface 52 of the input hub 12 and the from surface 54 of the back plate 32.

A ring bearing 60 is interposed between the output hub 20 and the back plate 32. The ting bearing 60 accommodates relative rotation of the input hub 12 and back plate 32 with respect to the output hub 20. As may be seen in FIG. 2, the back plate 32 has a shoulder 62 that engages a portion of the back surface 64 of the ring bearing 60. The ring bearing 60 assists in holding the concentricity of the output hub 20 when the output hub 20 is rotating at a different rate than the input hub 12 and the back plate 32—in other words, when there is relative rotation between the two. In this manner, it helps prevent excess wear from occurring.

As may also be seen in FIG. 2, a cover plate 66 is connected to the output hub 20 by a plurality of bolts 68. Each bolt 68 engages a threaded bore 70 disposed in the output hub 20. A lock washer 72 disposed between the cover plate 66 and the bolt head 74 holds the bolt 68 in position. A hole 76 is located in the center of the cover plate 66 and is aligned with the centerline 78 of the output shaft 24. When desired, the hole 76 allows a bolt (not shown) to further attach the output shaft 24 to the output hub 20 through the cover plate 66. When not so bolted, the cover plate 66 retains the floating output shaft 24 by presenting a surface for the output shaft 24 to abut. The output shaft 24 typically is connected to a gearbox (not shown) in a similar manner. Thus, the output shaft 24 is a floating shaft that may move slightly in an axial direction. This structure is essential for use with hollow shaft motor applications to contain the output shaft 24.

As described above, power is transferred between the input hub 12 and the output hub 20 through a plurality of separator plates and friction disks 26. Specifically, a pressure plate 80 is disposed directly behind the input hub 12. The pressure plate 80 is generally disk-shaped, having a circular-shaped, inner opening having a diameter large enough to surround at least a portion of the output hub 20 without contacting the output hub 20. The pressure plate 80 has a plurality of notches 82 that extend around the plurality of legs 34 that project from the input hub 12. In the preferred embodiment of the present invention, the pressure plate 80 has four notches 82 corresponding to the four legs 34. The front surface 84 of the pressure plate 80 is contacted by the ends of a plurality of spring cup assembly washers 88 that exert force rearwardly on the pressure plate 80 in a manner that will be hereinafter more fully described. It will be appreciated that the configuration of the pressure plate 80 forces it to rotate with the input hub 12 but allows it to move axially along a path parallel to the centerline 78 of the input 16 and output 24 shafts.

A first friction disk 90 is disposed directly behind the pressure plate 80 such that the rear surface 92 of the pressure plate 80 contacts the front surface 94 of the first friction disk 90. As may perhaps best be seen in FIG. 2, the first friction disk 90 has an outer diameter that is slightly less than the inner diameter of the legs 34 that extend from the input hub 12. The friction disk 90, therefore, may rotate independently of the input hub 12 and the back plate 32. The first friction disk 90 may not, however, rotate independently of the output hub 20. A plurality of dowel pins 96 extend through the output hub 20 and the first friction disk 90 preventing the first friction disk 90 from rotating independently of the output hub 20, but permitting the first friction disk 90 to move axially. The friction disk 90 must be able to move axially as it wears thinner. The dowel pins 96 also serve as torque pins to transfer torque between the output hub 20 and the first friction disk 90. Friction material 98 is connected or integrally formed as rings on both the from 94 and rear 100 surfaces of the first friction disk 90.

The rear surface 100 of the first friction disk 90 contacts the from surface 102 of a separator plate 104. The cross section of the separator plate 104 is similar to the cross section of the pressure plate 80. Like the pressure plate 80, the separator plate 104 rotates with the input hub 12 and may move axially. The rear surface 106 of the separator plate 104 contacts the front surface 108 of a second friction disk 110.

The second friction disk 110 may be integrally formed as a portion of the output hub 20 as shown in FIG. 2. The second friction disk 110 may also be rigidly connected to the output hub 20 by other known means. The rigid connection prevents the output hub 20 from wobbling during motor 18 operation, and prevents other such undesirable movement that causes fretting corrosion, or wear in the areas where the friction disks 90 and 110 contact the pressure plate 80, the separator plate 104, and the back plate 32. The outer surface 112 of the second friction disk 110 is disposed slightly inside of the inside surface 38 of the legs 34 as the first friction disk 90 is disposed. The second friction disk 110 has rings of friction material 98 disposed on both surfaces of the disk 110, the rear surface 114 contacting the front surface 54 of the back plate 32. The second friction disk 110 rotates with the output hub 20 and is axially constrained therewith.

As can be seen in FIG. 1, but perhaps best seen in FIG. 2, a plurality of wear/torque pins 120 extend from the back plate to the input hub 12 passing through both the separator plate 104 and the pressure plate 80. The friction disks 90 and 110 rotate inwardly of the wear/torque pins 120. The wear/torque pins 120 serve three functions by transferring torque, indicating wear, and holding a subassembly together for ease of assembly, as will be presented later. In the preferred embodiment of the present invention, two wear/torque pins 120 are oppositely disposed between the notches 82. Each wear/torque pin 120 has two shoulders 124,126. The first shoulder 124 engages the back plate 32 and limits the movement of the pin 120 in a forward direction. The second shoulder 126 engages the pressure plate 80 and allows the pressure plate 80 to urge the pin 120 rearwardly. A keeper 128 fixes the movement of the pin 120 to the movement of the pressure plate 80. The wear/torque pins 120 slidably engage the back plate 32, the separator plate 104, the pressure plate 80, and the input hub 12. It will be readily appreciated that, as the name implies, the wear/torque pins 120 serve as torque pins, transferring torque between the pressure plate 80, the separator plate 104, the back plate 32, and the input hub 12.

As the friction disks 90 and 110 wear thinner, the pressure plate 80 urges the pins 120 rearwardly. Over time, the ends of the wear/torque pins 120 become flush with the rear surface 132 of the back plate 32 indicating that the useful life of the friction material has ended and that the friction disks 90 and 110 should be replaced. As will later be more fully described, the wear/torque pins 120 also serve to hold the backplate 32, the output hub 20, the separator plate 104, the first friction disk 90, and the pressure plate 80 together while the torque limiting clutch assembly 10 is being assembled and disassembled.

As previously described, a plurality of washers 88 exert force against the front surface 84 of the pressure plate 80. The forceful engagement is obtained by various spring means operating in conjunction with each other. The major force applied against the pressure plate 80 is through a plurality of spring cup assemblies 138 comprising springs 140 disposed within spring cups 142. As can be seen in FIG. 1, a plurality of spring cup assemblies 138 are disposed about the torque limiting clutch assembly 10. Each spring cup assembly 138 is disposed such that the forces created by the spring cup assembly 138 act along a line that passes through the plurality of pressure plates and friction disks 26. The location of the spring cup assemblies 138, within a cylinder containing the friction disks, also allows the overall size of the torque limiting clutch assembly 10 to be reduced. The location further allows the pressure plate 80 to be thinner because the pressure plate 80 does not have to be designed to withstand bending forces.

An inspection bore 144 is provided in each spring cup 142 to allow an operator to view the spring 140 which, in the preferred embodiment of the present invention, is color coded to define a specific characteristic force. Accordingly, confirmation that the torque limiting clutch assembly 10 has the appropriate characteristic breakaway force or torque can be readily made by the operator by viewing the color of the springs 140 through the inspection bore 144.

Each spring cup 142 has a pin 148 extending therethrough about which the spring 140 is disposed. The pin 148 has a circumferential flange or head 146 at its end that prevents the cup 142 from sliding off the pin 148. The spring 140 contacts the closed end of the cup 142 and a washer 88 that is connected to the pin 148 by an appropriate retaining ring 150. The spring cup 142 has a circumferential, outwardly disposed flange 152 that engages the input hub 12 as shown. Accordingly, the spring 140 urges the pressure plate 80 away from the input hub 12 and towards the first friction disk 90. The spring cup assemblies 138 are preassembled by sliding the pin 148 through the cup 142 and then sliding the spring 140 over the pin 148. The washer 88 is then attached by pushing it against the spring 140 to compress the spring 140 while the retaining ring 150 is attached.

When the torque limiting clutch assembly 10 is installed on an input shaft 16 connected to a motor 18 and an output shaft 24 connected to a work implement (not shown), the torque generated by the motor 18 is transferred to the output shaft 24 through the torque limiting clutch assembly 10. The characteristic breakaway torque of the torque limiting clutch 10 may be set or determined by the strength of the springs 140 that are present in the spring cups 142. If stronger springs 140 are used, the breakaway torque will be accordingly higher.

To install the torque limiting clutch assembly 10, the input hub 12 is first splined to the input shaft 16. The locknut 28 is then attached to the input shaft 16 thus preventing the input hub 12 from sliding back off the input shaft 16. The preassembled spring cup assemblies 138 are next inserted into holes present in the input hub 12. Next, the separator plate 104 and the first friction disk 90 are positioned on the output hub 20. The dowel pins 96 are inserted through the output hub 20 and the first friction disk 90. The ting bearing 60 and the back plate 32 are then positioned relative to the output hub 20 and held in place with the wear/torque pins 120. The pressure plate 80 is then positioned on the wear/torque pins 120 and the keeper 128 is attached.

It can now be seen that the output hub 20, the separator plate 104, the first friction disk 90, the pressure plate 80, the ring beating 60, the dowel pins 96, and the backplate 31 are held together as a unit by the wear/torque pins 120. To complete the assembly of the torque limiting clutch assembly 10, the seal 33 is positioned and the output hub 20 is slid onto the output shaft 24 and aligned with the input hub 12. The preassembled alignment dowels 50 establish alignment between the backplate 32 and the input hub 12. The bolts 42 are then screwed into the input hub 12 causing the pressure plate 80 to press against the washers 88 thereby compressing the springs 140. The output hub 20 is then splined to the output shaft 24 and the cover plate 66 is attached. One advantage the torque limiting clutch assembly 10 provides is that the plurality of separator plates and friction disks 26, the pressure plate 80, the output hub 20, the ring bearing 60, and the backplate 32 may be installed and removed as a unit. When this unit is removed, the spring cup assemblies 138 are instantly accessible. To disassemble the torque limiting clutch assembly 10, the installation steps are simply performed in reverse order.

Under normal operating conditions, the input shaft 16 delivers torque to the input hub 12. The input hub 12 imparts the torque to the pressure plate 80, the separator plate 104, and the back plate 32 by means of the connections described above. The springs 140 urge the washers 88 against the pressure plate 80, thereby urging it against the first friction disk 90. The first friction disk 90 correspondingly is forced against the separator plate 104, it against the second friction disk 110, and it against the back plate 32. The friction material 98 causes the friction disks 90 and 110 to rotate with the input hub 12. The output hub 20, being directly connected to the friction disks 90 and 110, also rotates.

The torque limiting clutch assembly 10 operates when the output shaft 24 encounters resistance that creates a torque in the output shaft 24 larger than the characteristic breakaway torque of the clutch 10. When this occurs, the first 90 and second 110 friction disks rotate against the separator plate 104, pressure plate 80, and the back plate 32, preventing the torque in excess of the characteristic breakaway torque from being transferred back into the input hub 12, thereby preventing damage to the drive system. The breakaway torque may be calculated in a well known manner by using the force of the springs 140, the dimensions of the pressure plates 80, the separator plate 104, and friction disks 90 and 110, and the friction coefficient of the friction material. The breakaway torque may be adjusted by changing the springs 104.

Thus it can be seen that the objects of the invention have been satisfied by the structure presented above. While in accordance with the patent statute only the best mode and preferred embodiment of the invention have been presented and described in detail, it is to be understood that the invention is not limited thereto or thereby. Accordingly, for an appreciation of the true scope and breadth of the invention reference should be made to the following claims.

What is claimed is:

1. A torque limiting clutch assembly for use with hollow-shafted motors, said clutch assembly: comprising:
   an input hub anchored to a hollow-shafted motor;
   a back plate maintained in a fixed spaced relationship with said input hub;
   a plurality of friction disks interleaved with at least one separator plate between said input hub and said back plate;
   a pressure plate interposed between said input hub and said interleaved friction disks and at least one separator plate;
   spring means operatively interposed between said input hub and said pressure plate for urging said interleaved friction disks and at least one separator plate into frictional engagement with each other;
   an output hub operatively connected to said friction disks; and,
   a bearing interposed between said output hub and said back plate.

2. A torque limiting clutch assembly according to claim 1, wherein said spring means generate forces that act in line with said interleaved plurality of friction disks and said at least one separator plate; said spring means being maintained within a cylinder defined by an axial projection of an outer circumferential surface of the smaller of said friction disks and separator plate.

3. A torque limiting clutch assembly according to claim 2, wherein
   said spring means are supported by said input hub, and
   said forces created by said spring means act substantially perpendicular to said interleaved plurality of friction disks and said at least one separator plate.

4. A torque limiting clutch assembly according to claim 2, wherein
   said forces created by said spring means act against said pressure plate, and
   said pressure plate is urged by said forces into at least one of said friction disks.

5. A torque limiting clutch assembly according to claim 1, wherein said spring means comprises a plurality of spring cup assemblies interposed between said input hub and said pressure plate and urging said pressure plate away from said input hub.

6. A torque limiting clutch assembly according to claim 5, wherein each of said plurality of spring cup assemblies comprises a pin connected to a washer, said washer engaging said pressure plate, a spring surrounding said pin and urging said washer against said pressure plate, and a spring cup surrounding said spring and operatively connecting said spring to said input hub.

7. A torque limiting clutch assembly according to claim 6, wherein each of said spring cups has an inspection bore disposed such that each of said springs may be viewed from outside said spring cup assembly.

8. A torque limiting clutch assembly according to claim 1, further comprising torque transfer means for transferring torque between said input hub, said pressure plate, said separator plate, and said back plate.

9. A torque limiting clutch assembly according to claim 8, wherein said torque transfer means comprises a wear pin means for indicating wear to said plurality of fiction disks.

10. A torque limiting clutch assembly according to claim 9, wherein said wear pin means is fixedly connected to said pressure plate.

11. A torque limiting clutch assembly according to claim 8, wherein said torque transfer means comprises at least one pin means for holding said plurality of friction disks and at least one separator plate, said pressure plate, said back plate, said bearing, and said output hub together while the torque limiting clutch assembly is being assembled and disassembled.

12. A torque limiting clutch assembly according to claim 1, wherein said at least one separator plate and said pressure plate are non-rotatably disposed with respect to said input hub.

13. A torque limiting clutch assembly according to claim 1, wherein at least one of said friction disks is rigidly connected to said output hub.

14. A torque limiting clutch assembly according to claim 1, further comprising:
   first means for maintaining said input hub in connection with an input shaft; and
   second means for maintaining said output hub in connection with an output shaft.

15. A torque limiting clutch assembly according to claim 14, wherein said second means comprises a coverplate connected to said output hub.

16. A torque limiting clutch assembly for hollow shafted motors, comprising:
   an input hub;
   a back plate fixedly interconnected to said input hub;
   friction disks interleaved with at least one separator plate and a pressure plate maintained between said input hub and said back plate;
   spring means engaging said pressure plate and urging said frictions disks, said separator plate, and said pressure plate into frictional engagement;
   an output hub;
   at least one of said friction disks connected to said output hub;
   said input hub and said spring means comprising a first unit;
   said second output hub, said pressure plate, said at least one separator plate, said at least one of said friction disks, and said back plate comprising a second unit; and
   said first and second units being selectively interconnected with and disconnected from each other as contained units.

17. A torque limiting clutch assembly according to claim 16, further comprising indicator means for indicating when said plurality of friction disks are worn.

18. A torque limiting clutch assembly according to claim 17, wherein said indicator means comprises at least one wear pin connected to said pressure plate and slidably received through said separator plate and said back plate.

19. A torque limiting clutch assembly according to claim 16, further comprising means for holding said back plate, said output hub, said separator plate, and said pressure plate together while the torque limiting clutch is being assembled or disassembled.

20. A torque limiting clutch assembly according to claim 16, further comprising a bearing interposed between said back plate and said output hub.

21. A torque limiting clutch assembly according to claim 16, wherein said spring means create forces that act in line with said pressure plate, said friction disks, and said separator plate.

22. A torque limiting clutch assembly according to claim 21, wherein said spring means comprises a plurality of spring cup assemblies that are operatively interposed between said input hub and said pressure plate, each of said spring cup assemblies having an inspection bore.

23. A torque limiting clutch assembly according to claim 16, further comprising a seal interposed between said output hub and said input hub.

24. The torque limiting clutch assembly according to claim 16, wherein said at least one of said friction disks is integral with said output hub.

25. A torque limiting clutch assembly, comprising:

an input hub;

a back plate fixedly interconnected to said input hub;

friction disks interleaved with at least one separator plate and a pressure plate maintained between said input hub and said back plate;

spring means engaging said pressure plate and urging said frictions disks, said separator plate, and said pressure plate into frictional engagement;

an output hub;

at least one of said friction disks connected to said output hub; and means for holding said back plate, said output hub, said separator plate, said at least one of said friction disks, and said pressure plate together as a unit while the torque limiting clutch is being assembled or disassembled.

26. A torque limiting clutch assembly according to claim 25, wherein said unit further comprises a bearing interposed between said back plate and said output hub.

27. A torque limiting clutch assembly according to claim 26, wherein said means for holding comprises at least one wear/torque pin connected to said pressure plate and slidably received through said separator plate and said back plate.

* * * * *